United States Patent
Nakata

(10) Patent No.: US 10,810,751 B2
(45) Date of Patent: Oct. 20, 2020

(54) DISTANCE MEASURING APPARATUS AND DISTANCE MEASURING METHOD

(71) Applicant: Panasonic Intellectual Property Corporation of America, Torrance, CA (US)

(72) Inventor: Yohei Nakata, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 185 days.

(21) Appl. No.: 16/001,443

(22) Filed: Jun. 6, 2018

(65) Prior Publication Data

US 2018/0374228 A1    Dec. 27, 2018

(30) Foreign Application Priority Data

Jun. 23, 2017  (JP) .................................. 2017-123640
Mar. 7, 2018  (JP) .................................. 2018-040866

(51) Int. Cl.
| | |
|---|---|
| *G06K 9/00* | (2006.01) |
| *G06T 7/55* | (2017.01) |
| *G06T 7/70* | (2017.01) |
| *H04N 5/225* | (2006.01) |
| *H04N 5/353* | (2011.01) |

(52) U.S. Cl.
CPC .................. *G06T 7/55* (2017.01); *G06T 7/70* (2017.01); *H04N 5/2251* (2013.01); *H04N 5/2253* (2013.01); *G06T 2207/10016* (2013.01); *H04N 5/3532* (2013.01)

(58) Field of Classification Search
CPC ... G06T 7/55; G06T 7/70; G06T 2207/10016; H04N 5/2251; H04N 5/2253; H04N 5/3532
See application file for complete search history.

(56) References Cited

U.S. PATENT DOCUMENTS

| | | | | |
|---|---|---|---|---|
| 7,353,954 B1 * | 4/2008 | Malek | ................... | B07C 5/3404 198/400 |
| 8,576,286 B1 * | 11/2013 | Childs | .................. | H04N 13/243 348/148 |
| 9,911,197 B1 * | 3/2018 | Kim | ........................ | G06T 7/204 |
| 9,977,312 B1 * | 5/2018 | Lefever | ................ | H04N 5/2251 |

(Continued)

FOREIGN PATENT DOCUMENTS

JP    2011-185720    9/2011

*Primary Examiner* — Joseph Suh
(74) *Attorney, Agent, or Firm* — Greenblum & Bernstein, P.L.C.

(57) ABSTRACT

An apparatus includes: an image capture sensor configured to perform imaging by employing a rolling shutter method; a stand configured to move the image capture sensor; a processor; and a memory. A first still image is obtained by using the image capture sensor while the image capture sensor is moved by the stand at a first constant speed. A second still image is obtained by using the image capture sensor while the image capture sensor is moved by the stand at a second constant speed or is remained stationary. Inclination information, which indicates an inclination difference between an image of an object in the first still image and an image of the object in the second still image, is specified. Distance information, which indicates a distance, is generated by using the specified inclination information.

10 Claims, 14 Drawing Sheets

(56) References Cited

U.S. PATENT DOCUMENTS

| | | | |
|---|---|---|---|
| 2012/0033098 A1* | 2/2012 | Matsuyama | H04N 5/3532 |
| | | | 348/222.1 |
| 2012/0249748 A1* | 10/2012 | Nagano | G02B 27/123 |
| | | | 348/47 |
| 2014/0063193 A1* | 3/2014 | Williams | H04N 13/282 |
| | | | 348/46 |
| 2014/0210950 A1* | 7/2014 | Atanassov | G01B 11/02 |
| | | | 348/47 |
| 2015/0350556 A1* | 12/2015 | Lee | H04N 5/23219 |
| | | | 348/143 |
| 2017/0171437 A1* | 6/2017 | Xiao | H04N 5/23245 |
| 2018/0208112 A1* | 7/2018 | Tayama | B60Q 5/006 |
| 2019/0098180 A1* | 3/2019 | Tachi | H04N 9/04515 |

\* cited by examiner

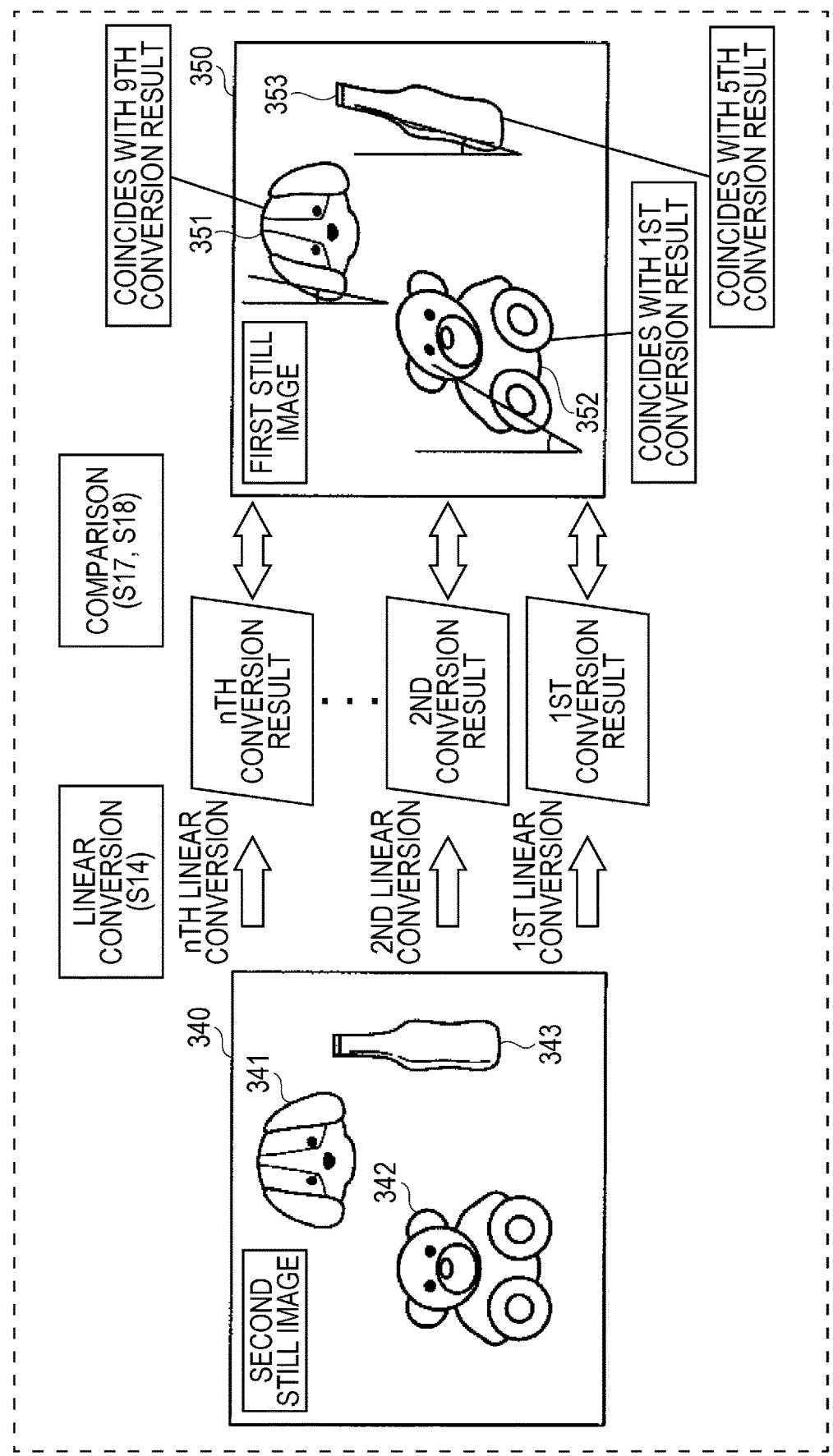

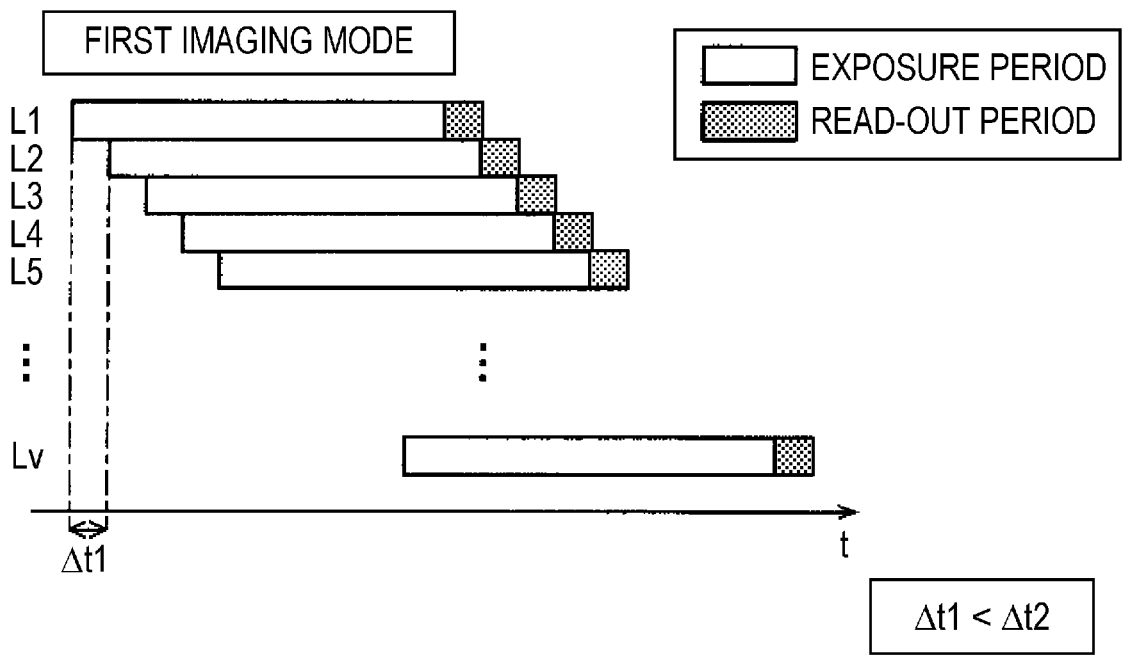
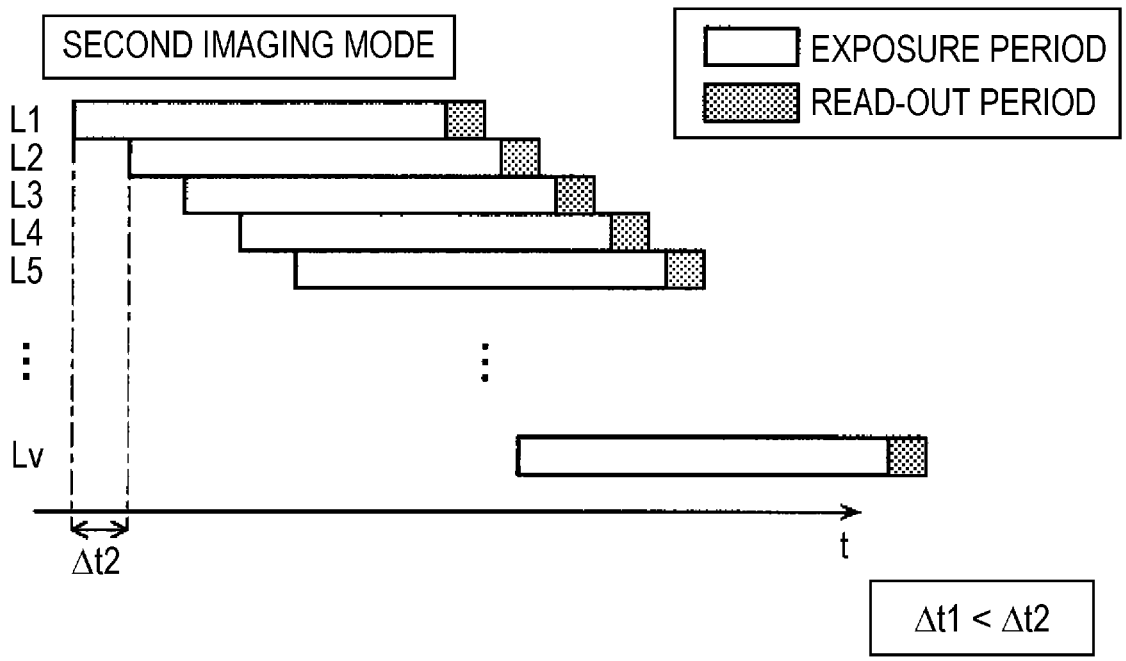

DISTANCE MEASURING APPARATUS AND DISTANCE MEASURING METHOD

BACKGROUND

1. Technical Field

The present disclosure relates to a distance measuring apparatus and a distance measuring method for measuring a distance to an object by using an imaging apparatus.

2. Description of the Related Art

Japanese Unexamined Patent Application Publication No. 2011-185720 discloses a distance acquisition apparatus that measures a distance by using stereo images captured by a stereo camera.

SUMMARY

The technology of Japanese Unexamined Patent Application Publication No. 2011-185720, however, increases the cost of hardware, because the technology needs two imaging apparatuses to obtain stereo images. In addition, the technology has a problem in which measuring a distance by performing image processing on stereo images has a heavy processing load.

One non-limiting and exemplary embodiment provides a distance measuring apparatus or the like that reduces the cost of hardware and the processing load.

In one general aspect, the techniques disclosed here feature an apparatus including an image capture sensor that performs imaging by employing a rolling shutter method, a stand that moves the image capture sensor at a constant speed, a processor, and a memory. The memory stores a computer program, which when executed by the processor, causes the processor to perform operations including obtaining a first still image by using the image capture sensor while the image capture sensor is moved by the stand at a first constant speed, obtaining a second still image by using the image capture sensor while the image capture sensor is moved by the stand at a second constant speed slower than the first constant speed or remains stationary, obtaining relationship information in which as a distance to an object from the image capture sensor increases, an inclination difference between the object in the first still image and the object in the second still image decreases, specifying inclination information indicating the inclination difference between a region of the first still image and the region of the second still image by comparing the first still image and the second still image with each other, and generating distance information indicating a distance specified by using the specified inclination information, the distance being associated with the relationship information.

A distance measuring apparatus according to the present disclosure may reduce the cost of hardware and the processing load.

It should be noted that general or specific embodiments may be implemented as a system, a method, an integrated circuit, a computer program, a storage medium, such as a computer-readable CD-ROM, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 8 is a diagram for describing comparison processing;

FIGS. 9A and 9B are diagrams for describing a first imaging mode and a second imaging mode;

DETAILED DESCRIPTION

Figure 1:
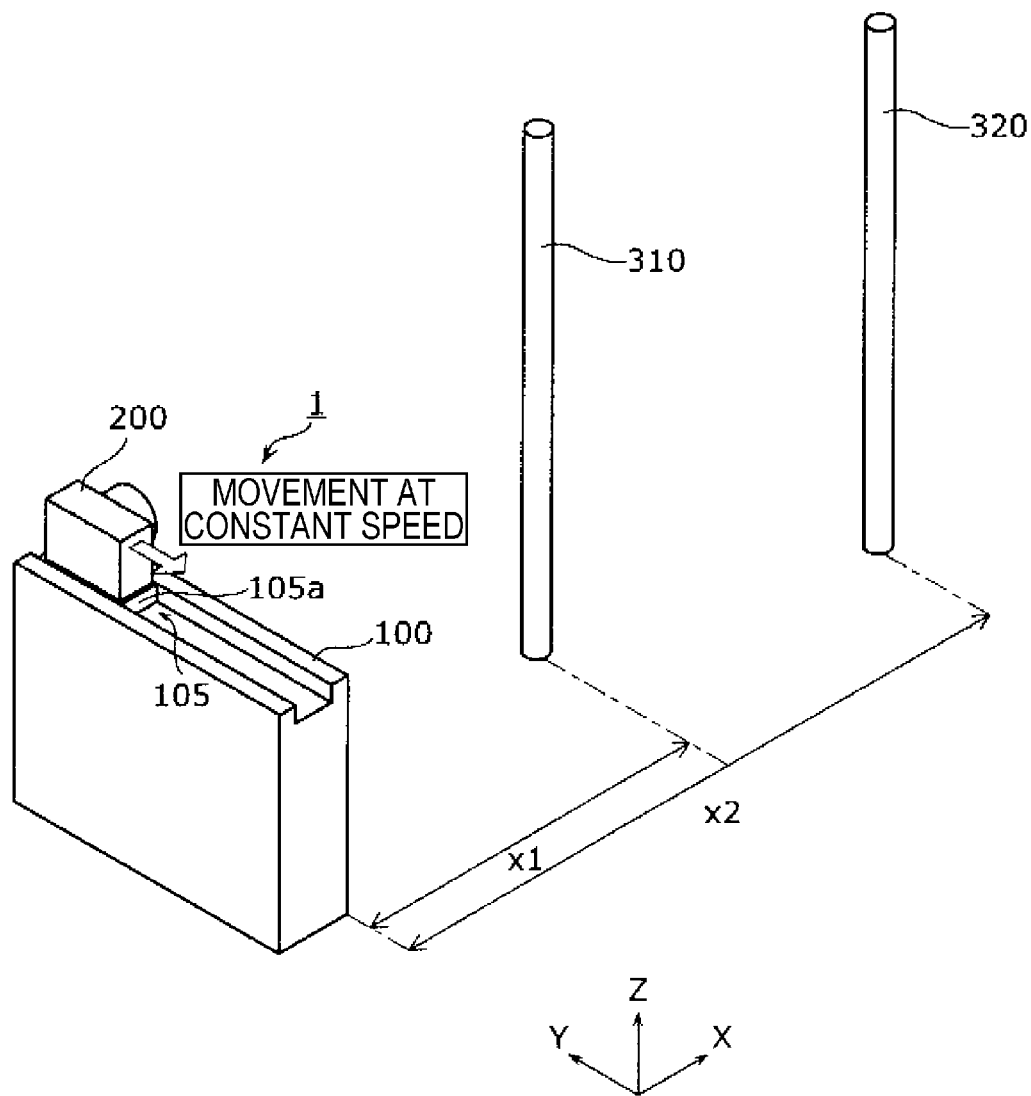
FIG. 1 is a schematic diagram for describing a distance measuring system according to an embodiment.

A distance measuring apparatus according to an aspect of the present disclosure is an apparatus including an image capture sensor that performs imaging by employing a rolling shutter method, a stand that moves the image capture sensor at a constant speed, a processor, and a memory. The memory stores a computer program, which when executed by the processor, causes the processor to perform operations including obtaining a first still image by using the image capture sensor while the image capture sensor is moved by the stand at a first constant speed, obtaining a second still image by using the image capture sensor while the image capture sensor is moved by the stand at a second constant speed slower than the first constant speed or remains stationary, obtaining relationship information in which as a distance to an object from the image capture sensor increases, an inclination difference between the object in the first still image and the object in the second still image decreases, specifying inclination information indicating the inclination difference between a region of the first still image and the region of the second still image by comparing the first still image and the second still image with each other, and generating distance information indicating a distance specified by using the specified inclination information, the distance being associated with the relationship information.

This employs a feature in which, in the first still image, which is obtained by performing imaging while the imaging apparatus that performs imaging by employing a rolling shutter method is moved, as the distance that an object moves within an imaging target space for the imaging apparatus during exposure increases, the deviation increases between pixels adjacent to each other in a vertical direction. Usually, as an object is further from an imaging apparatus, blurring is less likely to occur even if an imaging apparatus moves, and thus the above-mentioned deviation between pixels is smaller. By using this, a distance from an imaging apparatus to an object may be easily specified by specifying the degree of deviation between pixels as a result of comparing the first still image and the second still image with each other, where the first still image is captured while the imaging apparatus is moving at a first speed and the second still image is captured while the imaging apparatus is moving at a second speed or remains stationary.

Since a distance to an object can be specified by using images captured by a single imaging apparatus as described above, the cost of hardware may be reduced. In addition, since a distance can be specified by specifying pixel deviation using two still images, the load for image processing may also be reduced.

Furthermore, in the obtaining of the relationship information, the relationship information in which distances having different lengths to the object from the image capture sensor and linear conversions corresponding to inclination differences, each of which is the inclination difference, are associated in one-to-one correspondence may be obtained. In the specifying, by comparing conversion results obtained by performing conversion on one image of the first still image and the second still image by utilizing each of the linear conversions associated in the relationship information with another image of the first still image and the second still image, the inclination information indicating the inclination difference between at least a region of the one image and at least the region of the other image may be specified. In the generating, the distance information indicating the distance specified as the distance to the object in the at least the region of the one image by using the specified inclination information may be generated, the distance being associated with the relationship information.

With this configuration, a distance to an object may be effectively specified with simple processing.

Moreover, in the apparatus, the image capture sensor may be configured to perform imaging for each row of rows of pixels arranged in a matrix form with a row exposure interval between an exposure start time for the row and an exposure start time for a subsequent row of the rows, the row exposure interval being a first row exposure interval or a second row exposure interval longer than the first row exposure interval. In the obtaining of the relationship information, in a case where the first still image and the second still image are captured with the first row exposure interval, first relationship information corresponding to the first row exposure interval may be obtained, and in a case where the first still image and the second still image are captured with the second row exposure interval, second relationship information corresponding to the second row exposure interval may be obtained. A distribution range of second distances associated in the second relationship information may be a distribution range of longer distances from the image capture sensor than first distances associated in the first relationship information. The value of distribution density of the second distances may be smaller than the value of distribution density of the first distances.

With this configuration, by adjusting blurring due to movement of an object, even if a distance to an object from the imaging apparatus is relatively long, the distance may be effectively specified.

Further, in the obtaining of the second still image, a third still image and a fourth still image may be obtained as the second still image, the third still image being captured with the first row exposure interval by the image capture sensor remaining stationary, the fourth still image being captured with the second row exposure interval by the image capture sensor remaining stationary. In the specifying, it may be determined whether an image difference between a region of the third still image and the region of the fourth still image is a certain extent or more by comparing the third still image and the fourth still image with each other. In a case where an image difference is present in the region to a certain extent or more, it may be determined that an object in the region is a moving object.

With this configuration, a moving object may be specified.

Moreover, the image capture sensor may be configured to perform imaging with a first focal length or a second focal length longer than the first focal length. In the obtaining of the relationship information, in a case where the first still image and the second still image are captured with the first focal length, third relationship information corresponding to the first focal length may be obtained. In a case where the first still image and the second still image are captured with the second focal length, fourth relationship information corresponding to the second focal length may be obtained. The distribution range of fourth distances associated in the fourth relationship information may be the distribution range of longer distances from the image capture sensor than third distances associated in the third relationship information. The value of distribution density of the fourth distances may be smaller than the value of distribution density of the third distances.

With this configuration, by adjusting the focal length in accordance with a distance from the image capture sensor, the distance to an object may be effectively specified.

It should be noted that general or specific embodiments may be implemented as a system, a method, an integrated circuit, a computer program, a storage medium, such as a computer-readable CD-ROM, or any selective combination thereof.

The distance measuring apparatus according to an aspect of the present disclosure will be described in detail below with reference to the drawings.

It should be noted that the embodiment described below represents one specific example of the present disclosure. The numerical values, shapes, materials, elements, arrangement positions and connection forms of elements, steps, the order of steps, and the like shown in the following embodiment are mere examples and are not intended to limit the present disclosure. Furthermore, among the elements in the following embodiment, elements not recited in any of the independent claims indicating the most generic concept of the present disclosure are described as preferable elements.

EMBODIMENT

An embodiment will be described below with reference to FIGS. 1 to 8.

1-1. Configuration

FIG. 1 is a schematic diagram for describing a distance measuring system according to the embodiment.

A distance measuring system 1 includes a distance measuring apparatus 100 and an imaging apparatus 200. The distance measuring apparatus 100 obtains still images captured by the imaging apparatus 200 and measures a distance x1 from the imaging apparatus 200 to an object 310 as a photographic subject and a distance x2 from the imaging apparatus 200 to an object 320 as a photographic subject by using the still images. More specifically, the distance measuring apparatus 100 measures the distances x1 and x2 to the objects 310 and 320 by using a first still image and a second still image, where the first still image is captured while the imaging apparatus 200 is moved in a Y-axis direction at a constant speed by an actuator 105 and the second still image is captured while the imaging apparatus 200 remains stationary.

The imaging apparatus 200 is a camera including an image sensor that operates by employing a rolling shutter method. The imaging apparatus 200 may be a digital camera, a smartphone, or the like. The imaging apparatus 200 is communicably connected to the distance measuring apparatus 100 so as to receive a control signal from the distance measuring apparatus 100.

It should be noted that, in FIG. 1, the direction in which the optical axis of the imaging apparatus 200 extends is an X-axis direction, the vertical direction is a Z-axis direction, and the direction perpendicular to both the X-axis direction and the Z-axis direction is the Y-axis direction.

Next, a specific example of a hardware configuration of the distance measuring apparatus 100 will be described with reference to FIG. 2.

Figure 2:
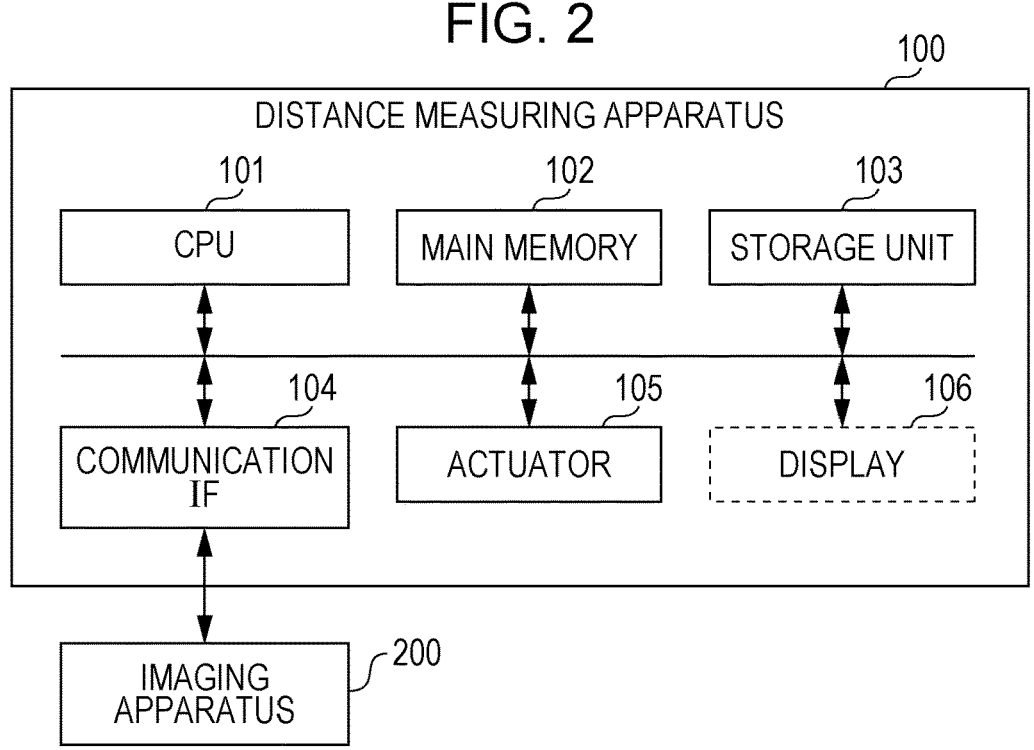
FIG. 2 is a block diagram illustrating an example of a hardware configuration of a distance measuring apparatus according to the embodiment.

FIG. 2 is a block diagram illustrating an example of a hardware configuration of a distance measuring apparatus according to the embodiment.

As illustrated in FIG. 2, the hardware configuration of the distance measuring apparatus 100 may include a central processing unit (CPU) 101, a main memory 102, a storage unit 103, a communication interface (IF) 104, and the actuator 105. The distance measuring apparatus 100 may further include a display 106.

The CPU 101 serves as a processor that executes a control program stored in the storage unit 103 or the like.

The main memory 102 serves as a volatile storage area that is used as a work area when the CPU 101 executes the control program.

The storage unit 103 serves as a non-volatile storage area that retains the control program, content data, and the like.

The communication IF 104 serves as a communication interface that communicates with the imaging apparatus 200 via a communication network. The communication IF 104 is, for example, a wired local area network (LAN) interface. The communication IF 104 may be a wireless LAN interface. In addition to the LAN interfaces, the communication IF 104 may be any communication interface capable of establishing a communication connection with a communication network.

The actuator 105 is disposed on, for example, the upper part of the body of the distance measuring apparatus 100 and moves a pedestal 105a, on which the imaging apparatus 200 is fixed, in the Y-axis direction at a constant speed. The actuator 105 may be constituted by, for example, a motor that drives the pedestal 105a by using a belt, or may be constituted by a gas cylinder, a hydraulic cylinder, or the like.

The display 106 serves as a display device that displays a picture including an image. For example, the display 106 is a liquid crystal display, or an organic EL display.

Next, a functional configuration of the distance measuring apparatus 100 will be described with reference to FIG. 3.

Figure 3:
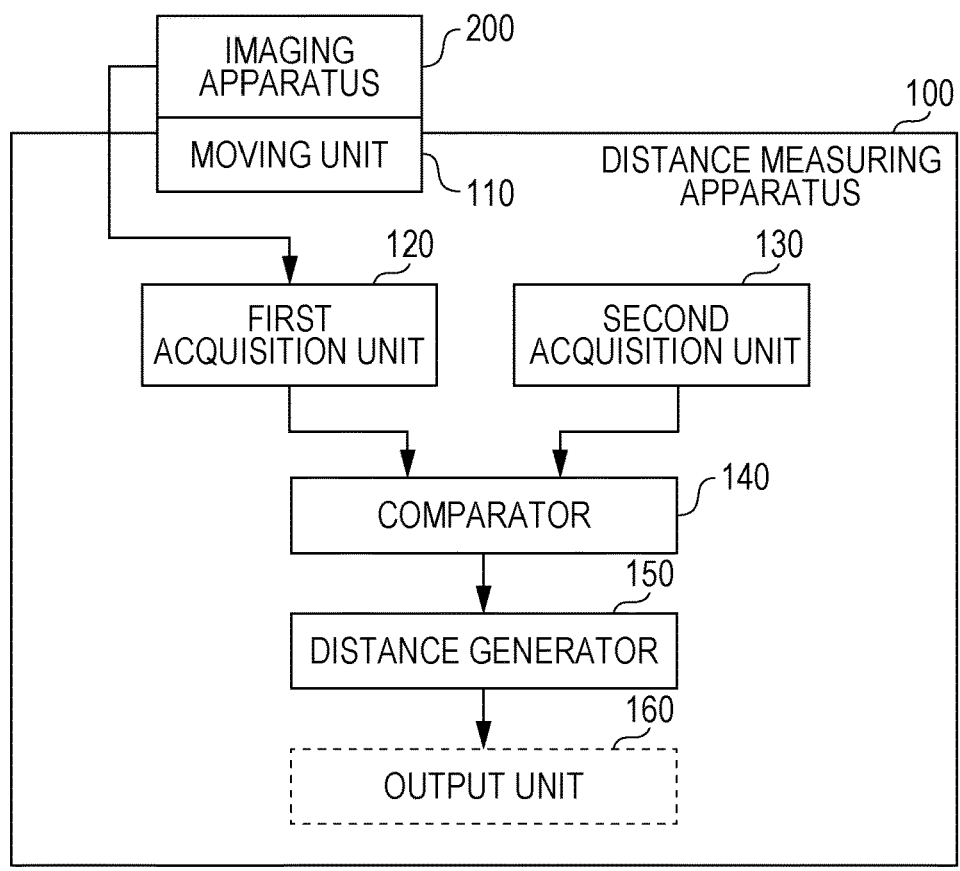
FIG. 3 is a block diagram illustrating an example of a functional configuration of the distance measuring apparatus according to the embodiment.

FIG. 3 is a block diagram illustrating an example of a functional configuration of the distance measuring apparatus according to the embodiment.

The functional configuration of the distance measuring apparatus 100 includes a moving unit 110, a first acquisition unit 120, a second acquisition unit 130, a comparator 140, and a distance generator 150. The distance measuring apparatus 100 may further includes an output unit 160.

The moving unit 110 moves the imaging apparatus 200 linearly at a constant speed. More specifically, the moving unit 110 moves the imaging apparatus 200 linearly in a row direction (the Y-axis direction or a horizontal direction) of the rolling-shutter-type image sensor included in the imaging apparatus 200 at a constant speed. The moving unit 110 moves the imaging apparatus 200 at a predetermined fixed speed. The moving unit 110, for example, causes the imaging apparatus 200 to first accelerate to the fixed speed and then to move at the fixed speed, and subsequently to decelerate and stop. The moving unit 110 is implemented as, for example, the actuator 105.

The first acquisition unit 120 obtains the first still image captured by the imaging apparatus 200 being moved linearly at a first speed by the moving unit 110 and the second still image captured by the imaging apparatus 200 remaining stationary. The first acquisition unit 120 is implemented as, for example, the communication IF 104.

The second acquisition unit 130 obtains relationship information indicating the relationship between a distance from the imaging apparatus 200 and an inclination difference between the first still image and the second still image. In the relationship information, the relationship between a distance and an inclination difference shows that the greater the distance, the smaller the inclination difference. The second acquisition unit 130 is implemented as, for example, the CPU 101 and the main memory 102.

Here, a distance from the imaging apparatus 200 means the distance from the imaging apparatus 200 in a state where the imaging apparatus 200 is disposed on the pedestal 105a of the actuator 105 of the distance measuring apparatus 100. In other words, a distance from the imaging apparatus 200 means the distance from a predetermined reference position of the actuator 105 of the distance measuring apparatus 100.

In this embodiment, the relationship information is stored in, for example, the storage unit 103. The second acquisition unit 130 obtains the relationship information by retrieving the relationship information stored in the storage unit 103. The relationship information may be stored on an external server. The second acquisition unit 130 may obtain the relationship information by connecting and communicating with the external server. In this case, the second acquisition unit 130 is implemented as, for example, the CPU 101, the main memory 102, and the communication IF 104.

Here, the relationship information will be described with reference to FIG. 4.

Figure 4:
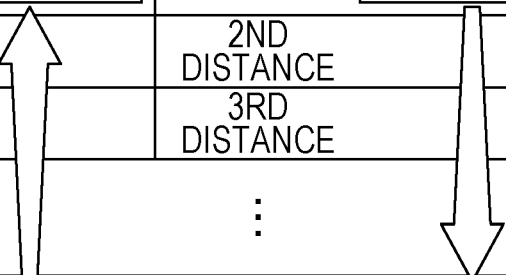
FIG. 4 is a diagram for describing relationship information according to the embodiment.

FIG. 4 is a diagram for describing the relationship information according to the embodiment.

As illustrated in FIG. 4, in the relationship information, linear conversions corresponding to respective inclination differences having different values and distances having different lengths from the imaging apparatus 200 are associated in one-to-one correspondence. In the 1st to nth linear conversions of the linear conversions, the inclination degrees for linear conversion vary. For example, the linear conversion converts a rectangular image to a parallelogram image by tilting two longitudinal sides of the rectangular image. That is, in the linear conversion, as the inclination degree increases, a rectangular image is converted into a parallelogram having greater inclination of two longitudinal sides. In FIG. 4, the 1st to nth linear conversions indicate that, the greater the value of "k" of the kth linear conversion, the smaller the inclination degree.

In addition, the 1st to nth linear conversions are associated in one-to-one correspondence with the 1st to nth distances. The 1st to nth distances indicate that, the greater the value of "k" of the kth distance, the greater (longer) the distance from the imaging apparatus 200. The relationship information is, for example, preset by performing calibration. Since in the relationship information the most appropriate values vary depending on a speed of uniform movement, calibration is performed in a state where the imaging apparatus 200 is moved at a constant speed at which the moving unit 110 drives the imaging apparatus 200. In a case where a speed of uniform movement caused by the moving unit 110 can be changed in multiple steps, multiple kinds of relationship information respectively corresponding with the multiple speeds may be stored in the storage unit 103 or the external server.

By comparing the first still image and the second still image with each other, the comparator 140 specifies inclination information indicating the inclination difference of a region between the first still image and the second still image. More specifically, the comparator 140 performs conversion on the second still image by utilizing each of the linear conversions associated in the relationship information. The comparator 140 then specifies inclination information indicating the inclination difference between a region of the first still image and the corresponding region of the second still image by comparing the conversion results obtained by performing conversion with the first still image.

When imaging is performed while the imaging apparatus 200 that performs imaging by employing a rolling shutter method is moved, an object moves within an imaging target space for the imaging apparatus 200 during exposure, thereby causing deviation in a horizontal direction between pixels adjacent to each other in a vertical direction in the captured image. As a result, a first object in the first still image is tilted with respect to the first object in the second still image. That is, the aforementioned inclination difference is an inclination degree at which an object in the first still image is tilted with respect to the object in the second still image.

It should be noted that, although the comparator 140 performs conversion on the second still image by utilizing each of the linear conversions in the above description, the first still image may be reverse-converted by utilizing each of the linear conversions. In this case, the comparator 140 specifies inclination information indicating the inclination difference between a region of the first still image and the corresponding region of the second still image by comparing the conversion results obtained by performing reverse-conversion with the second still image.

The comparator 140 is implemented as, for example, the CPU 101, the main memory 102, and the storage unit 103.

By using the inclination information specified by the comparator 140, the distance generator 150 specifies a distance associated with the relationship information obtained by the second acquisition unit 130 and generates distance information indicating the specified distance. More specifically, by using the inclination information specified by the comparator 140, the distance generator 150 specifies a distance associated with the relationship information and generates distance information indicating the distance specified as the distance to an object in a region of the first still image. The distance generator 150 is implemented as, for example, the CPU 101, the main memory 102, and the storage unit 103.

The output unit 160 outputs the distance information generated by the distance generator 150. More specifically, the output unit 160 may output the distance information by displaying the distance information on the display 106, or by informing an information terminal, such as a smartphone, of the distance information via the communication IF 104. The output unit 160 is implemented as, for example, the communication IF 104 or the display 106.

1-2. Operation

Next, the operation of the distance measuring system 1 according to the embodiment will be described.

Figure 5:
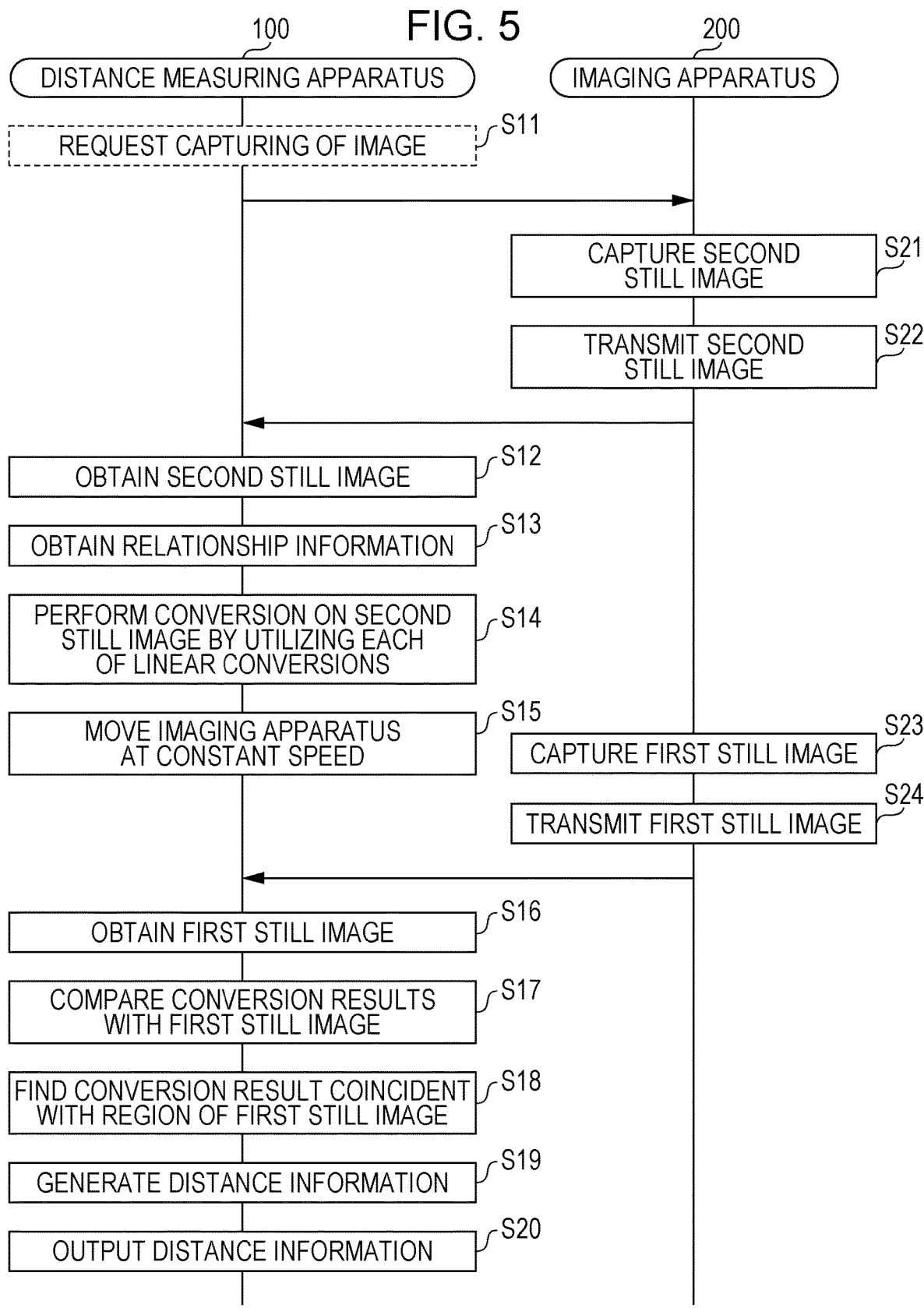
FIG. 5 is a sequence diagram illustrating an example of a distance measuring method of the distance measuring system according to the embodiment.
Figure 6:
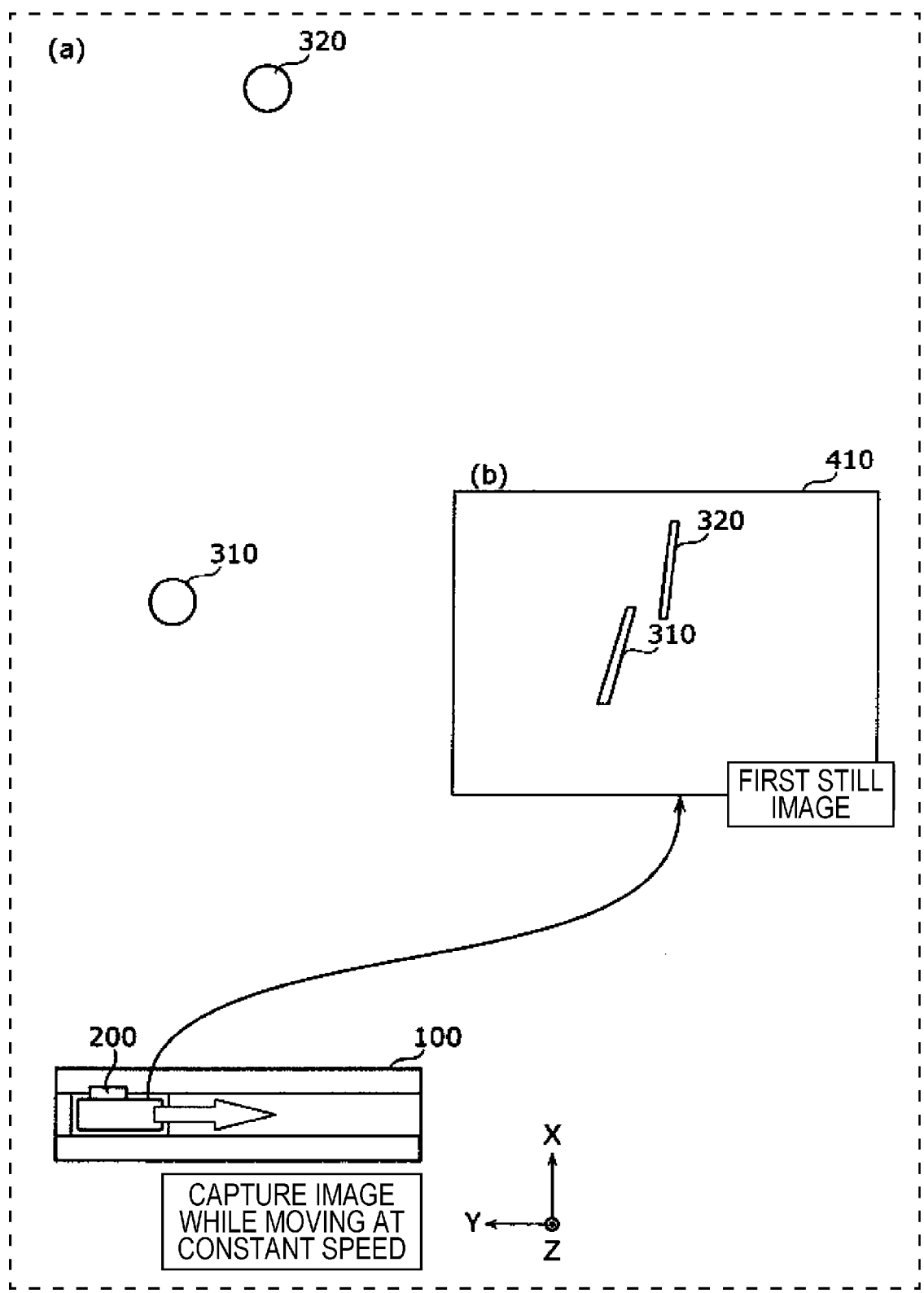
FIG. 6 is a diagram for describing a case of capturing a first still image.
Figure 7:
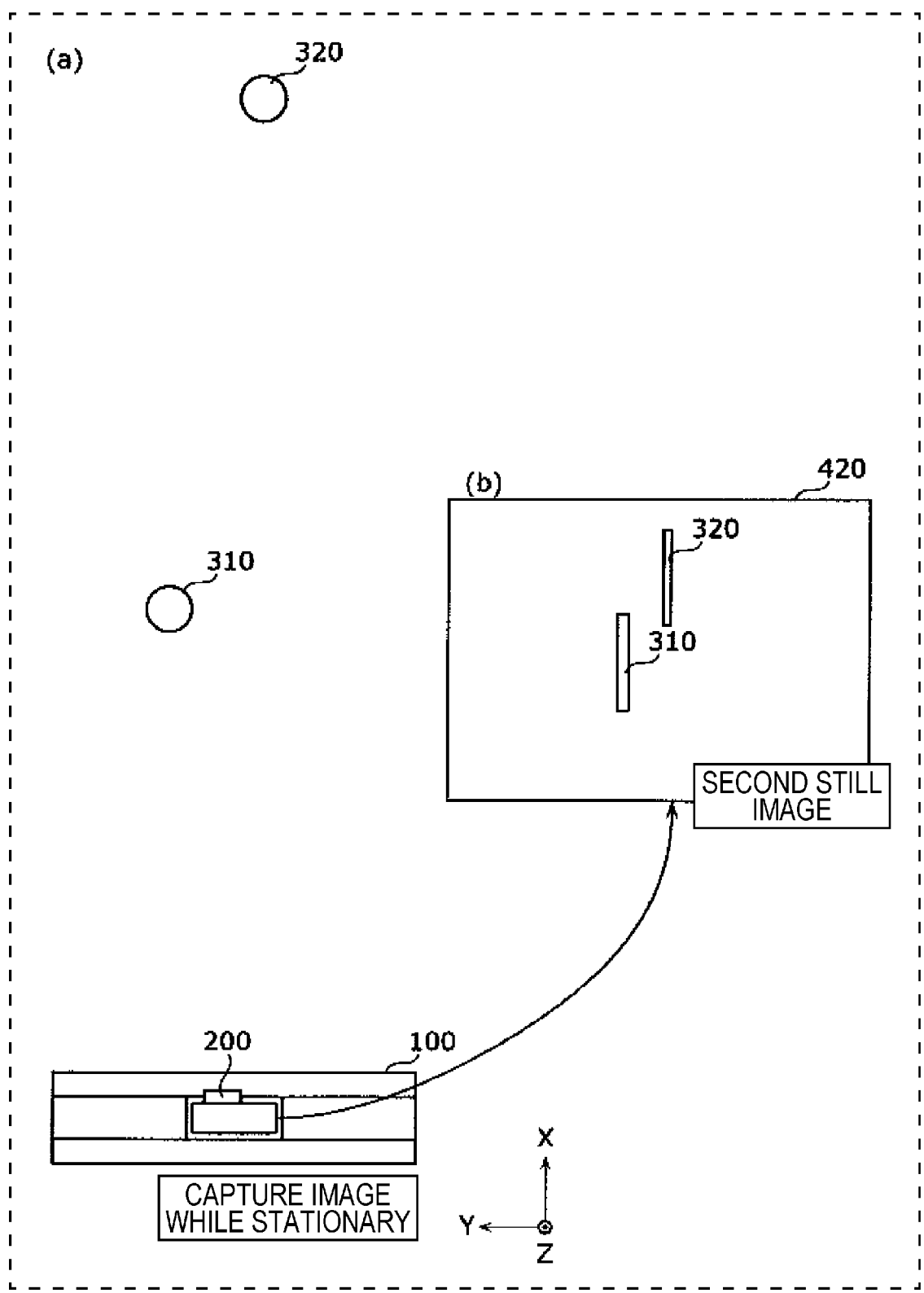
FIG. 7 is a diagram for describing a case of capturing a second still image.

FIG. 5 is a sequence diagram illustrating an example of a distance measuring method of the distance measuring system according to the embodiment. FIG. 6 is a diagram for describing a case of capturing the first still image. FIG. 7 is a diagram for describing a case of capturing the second still image.

First, the first acquisition unit 120 of the distance measuring apparatus 100 transmits a control signal including a request for capturing an image to the imaging apparatus 200 (S11). The distance measuring apparatus 100 may transmit the control signal multiple times at predetermined intervals. In this case, the process flow in FIG. 5 is repeated. Furthermore, the distance measuring apparatus 100 may transmit the control signal at a predetermined time. Moreover, the distance measuring apparatus 100 may not transmit the control signal to the imaging apparatus 200, and the imaging apparatus 200 may determine, at a predetermined interval or a predetermined time, to start the subsequent step S21.

Next, the imaging apparatus 200 obtains the second still image by performing imaging while remaining stationary (S21). For example, as illustrated in FIG. 7, the imaging apparatus 200 obtains a second still image 420 by imaging the objects 310 and 320 while remaining stationary.

Subsequently, the imaging apparatus 200 transmits the obtained second still image 420 to the distance measuring apparatus 100 (S22).

Accordingly, in the distance measuring apparatus 100, the first acquisition unit 120 obtains the second still image 420 (S12).

The second acquisition unit 130 then obtains the relationship information (S13).

The comparator 140 performs conversion on the second still image 420 by utilizing each of the linear conversions in the relationship information obtained by the second acquisition unit 130 (S14).

It should be noted that step S13 can be performed anytime before step S14.

In the distance measuring apparatus 100, in parallel with the operations in steps S13 and S14, the moving unit 110 moves the imaging apparatus 200 at a predetermined constant speed (S15). The imaging apparatus 200 obtains the first still image by performing imaging while moving at a constant speed (S23). For example, as illustrated in FIG. 6, the imaging apparatus 200 obtains a first still image 410 by imaging the objects 310 and 320 while moving at a constant speed. It should be noted that the imaging apparatus 200 images the same objects 310 and 320 for capturing the first still image 410 and the second still image 420 for the purpose of measuring distances.

The imaging apparatus 200 may obtain the first still image 410 by performing imaging at a predetermined timing of causing the moving unit 110 to move at a constant speed, the predetermined timing being indicated by information received from the distance measuring apparatus 100. The information indicating the predetermined timing may be transmitted, immediately before the distance measuring apparatus 100 causes the moving unit 110 to move, as a control signal for causing the imaging apparatus 200 to perform imaging, or included in the control signal including the request for capturing an image, the control signal including the request for capturing an image being transmitted in step S11. Furthermore, in a case where the imaging apparatus 200 is equipped with an acceleration sensor, the imaging apparatus 200 may capture the first still image 410 after detecting the start of movement of the imaging apparatus 200 by using the acceleration sensor. In this manner, steps S15 and S23 are performed synchronously.

As a result of performing the processing operations in steps S13 and S14 in parallel with the processing operations in steps S15 and S23, the processing time may be reduced.

Next, the imaging apparatus 200 transmits the first still image 410 to the distance measuring apparatus 100 (S24).

Accordingly, in the distance measuring apparatus 100, the first acquisition unit 120 obtains the first still image 410 (S16).

The comparator 140 then compares conversion results with the first still image 410 (S17).

Accordingly, the comparator 140 finds a conversion result coincident with a region of the first still image 410 and specifies inclination information by specifying the linear conversion corresponding to the coincident conversion result (S18).

Subsequently, the distance generator 150 generates distance information by using the specified inclination information and the relationship information (S19).

Finally, the output unit 160 outputs the generated distance information (S20).

FIG. 8 is a diagram for describing comparison processing.

As illustrated in FIG. 8, the comparator 140 obtains 1st to nth conversion results by performing linear conversion on a second still image 340 by using each of the 1st to nth linear conversions associated in the relationship information. The comparator 140 then compares each of the 1st to nth conversion results with a first still image 350.

As a result, the comparator 140 can determine that a ninth conversion result obtained by performing a 9th linear conversion on an object 341 in the second still image 340 coincides with an object 351 in the first still image 350. Similarly, the comparator 140 can determine that the 1st conversion result obtained by performing the 1st linear conversion on an object 342 in the second still image 340 coincides with an object 352 in the first still image 350. Likewise, the comparator 140 can determine that a 5th conversion result obtained by performing a 5th linear conversion on an object 343 in the second still image 340 coincides with an object 353 in the first still image 350.

Accordingly, in the subsequent processing the distance generator 150 can determine that a 9th distance corresponding to the 9th linear conversion is a distance from the imaging apparatus 200 to the object 341. Similarly, the distance generator 150 can determine that a 1st distance corresponding to the 1st linear conversion is a distance from the imaging apparatus 200 to the object 342. Likewise, the distance generator 150 can determine that a 5th distance corresponding to the 5th linear conversion is a distance from the imaging apparatus 200 to the object 343.

1-3. Advantage

The distance measuring system 1 according to this embodiment employs a feature in which, in the first still image, which is obtained by performing imaging while the imaging apparatus that performs imaging by employing a rolling shutter method is moved, as the distance that an object moves within an imaging target space for the imaging apparatus during exposure increases, the deviation increases between pixels adjacent to each other in a vertical direction. Usually, as an object is further from an imaging apparatus, blurring is less likely to occur even if an imaging apparatus moves, and thus the above-mentioned deviation between pixels is smaller. By using this, a distance from an imaging apparatus to an object may be easily specified by specifying the degree of deviation between pixels as a result of comparing the first still image and the second still image with each other, where the first still image is captured while the imaging apparatus is moving at a first speed and the second still image is captured while the imaging apparatus is moving at a second speed or remains stationary.

Since a distance to an object can be specified by using images captured by a single imaging apparatus as described above, the cost of hardware may be reduced. In addition, since a distance can be specified by specifying pixel deviation using two still images, the load for image processing may also be reduced.

1-4. Modified Examples

1-4-1. Modified Example 1

A modified example 1 will be described below.

With the distance measuring system 1 according to the above-described embodiment, a distance to an object may be measured by further using results obtained by imaging in different imaging modes. To be specific, a case where the imaging apparatus 200 is capable of selectively switching between a first imaging mode and a second imaging mode to perform imaging will be described.

FIGS. 9A and 9B are diagrams for describing the first imaging mode and the second imaging mode. In FIGS. 9A and 9B, exposure timings for rows L1 to Lv (v is a natural number) of pixels arranged in a matrix form in an image sensor included in the imaging apparatus 200 are illustrated.

As illustrated in FIG. 9A, in the first imaging mode, imaging is performed with a first row exposure interval $\Delta t1$, which is a row exposure interval between an exposure start time for a row Li (i is a natural number from 1 to v−1) and an exposure start time for the subsequent row Li+1. As illustrated in FIG. 9B, in the second imaging mode, imaging is performed with a second row exposure interval $\Delta t2$ that is longer than the first row exposure interval $\Delta t1$. In FIGS. 9A and 9B, the white part of a bar indicates an exposure period during which exposure is performed on the corresponding row, and the dot-hatching part of a bar indicates a read-out period of an electrical signal obtained by exposure.

In this case, in a case where the first still image and the second still image obtained by the first acquisition unit 120 are captured by employing the first row exposure interval, the second acquisition unit 130 obtains first relationship information corresponding to the first row exposure interval. In other words, the second acquisition unit 130 obtains the first relationship information corresponding to the first imaging mode.

Similarly, in a case where the first still image and the second still image obtained by the first acquisition unit 120 are captured by employing the second row exposure interval, the second acquisition unit 130 obtains second relationship information corresponding to the second row exposure interval. In other words, the second acquisition unit 130 obtains the second relationship information corresponding to the second imaging mode.

Here, the first relationship information and the second relationship information will be described.

Figure 10:
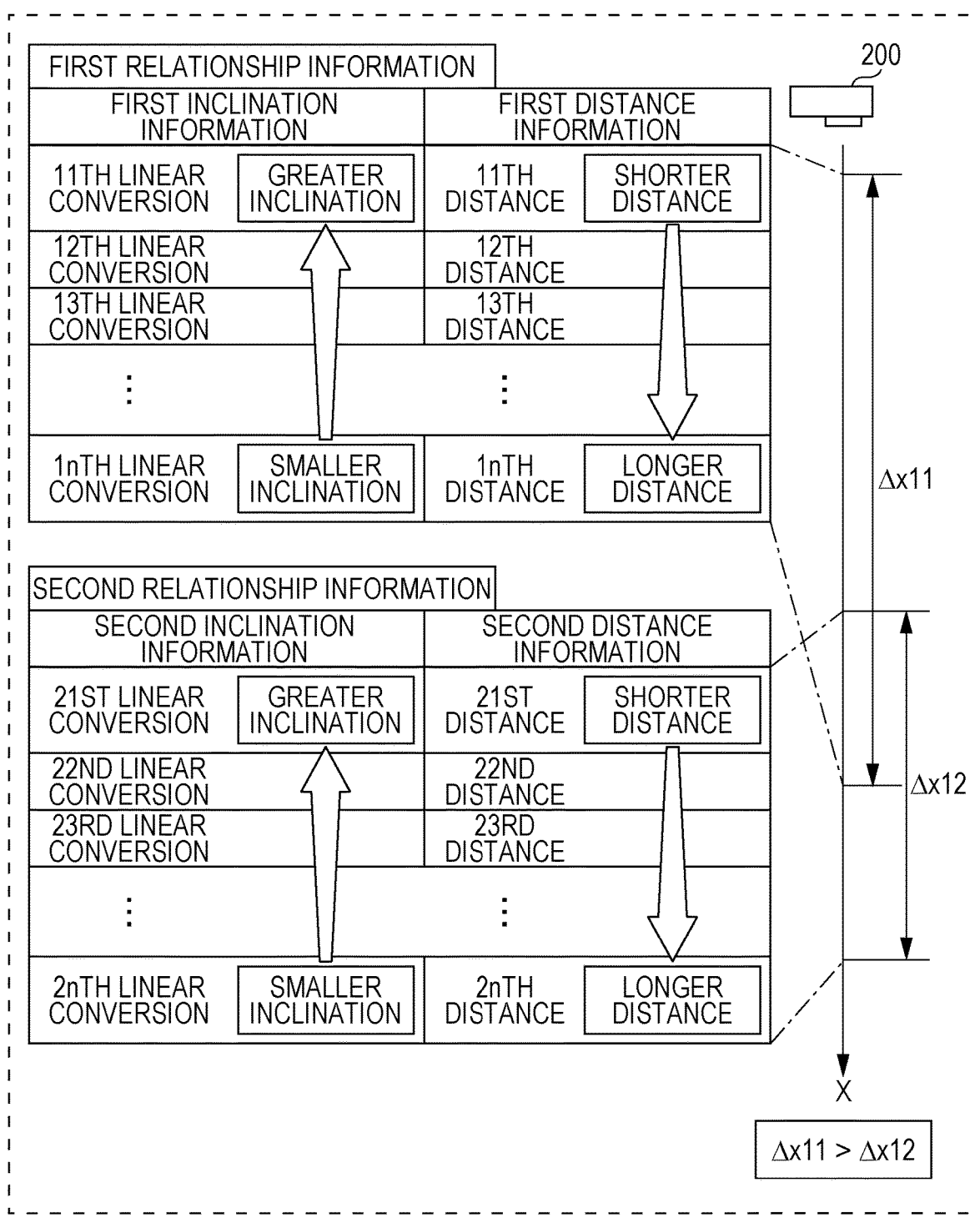
FIG. 10 is a diagram for describing first relationship information and second relationship information according to a modified example 1.

FIG. 10 is a diagram for describing the first relationship information and the second relationship information according to the modified example 1.

As described above, the first relationship information corresponds to the first imaging mode, and the second relationship information corresponds to the second imaging mode. In the first relationship information and the second relationship information, similarly to the relationship information illustrated in FIG. 4, linear conversions and distances are associated in one-to-one correspondence. Additionally, the 11th to 1 nth linear conversions and the 21st to 2nth linear conversions indicate that, the greater the value of "k" of the kth linear conversion, the smaller the inclination degree. Further, the 11th to 1 nth distances and the 21st to 2nth distances indicate that, the greater the value of "k" of the kth distance, the greater (longer) the distance from the imaging apparatus 200.

The distribution range of the 21st to 2nth distances associated in the second relationship information includes the distribution range of longer distances from the imaging apparatus 200 than the 11th to 1 nth distances associated in the first relationship information. The value of distribution density of the 21st to 2nth distances is smaller than the value of distribution density of the 11th to 1 nth distances. In other words, difference Δx11 between the 11th distance and the 1nth distance is greater than difference Δx12 between the 21st distance and the 2nth distance.

It should be noted that the distribution range of multiple distances indicated here by the 11th to 1 nth distances or the 21st to 2nth distances is the distance range in a X-axis direction within which multiple distances are distributed or the distance range of the shortest distance to the longest distance of the multiple distances. In other words, in a case of the 11th to 1 nth distances, the distribution range is the range from the position in the X-axis direction indicated by the 11th distance to the position in the X-axis direction indicated by the 1 nth distance. Similarly, in a case of the 21st to 2nth distances, the distribution range is the range from the position in the X-axis direction indicated by the 21st distance to the position in the X-axis direction indicated by the 2nth distance.

The distribution density of multiple distances indicated here by the 11th to 1 nth distances or the 21st to 2nth distances is the value obtained by dividing the distance range of the shortest distance to the longest distance of the multiple distances by the number of the multiple distances. That is, the distribution density of the 11th to 1nth distances is the value obtained by dividing the difference Δx11 by n that is the number of the 11th to 1 nth distances, which is represented by Δx11/n. Likewise, the distribution density of the 21st to 2nth distances is the value obtained by dividing the difference Δx12 by n that is the number of the 21st to 2nth distances, which is represented by Δx21/n.

The second relationship information can be defined with respect to the first relationship information as described above, because the second imaging mode has a longer row exposure interval than the first imaging mode, and thus a moving amount in an image being captured in the second imaging mode during exposure can be greater than that of the first imaging mode. Therefore, by using the imaging result of the second imaging mode, longer distances from the imaging apparatus 200 can be measured and resolution for distance measuring can be higher as compared to a case of using the imaging result of the first imaging mode.

Figure 11:
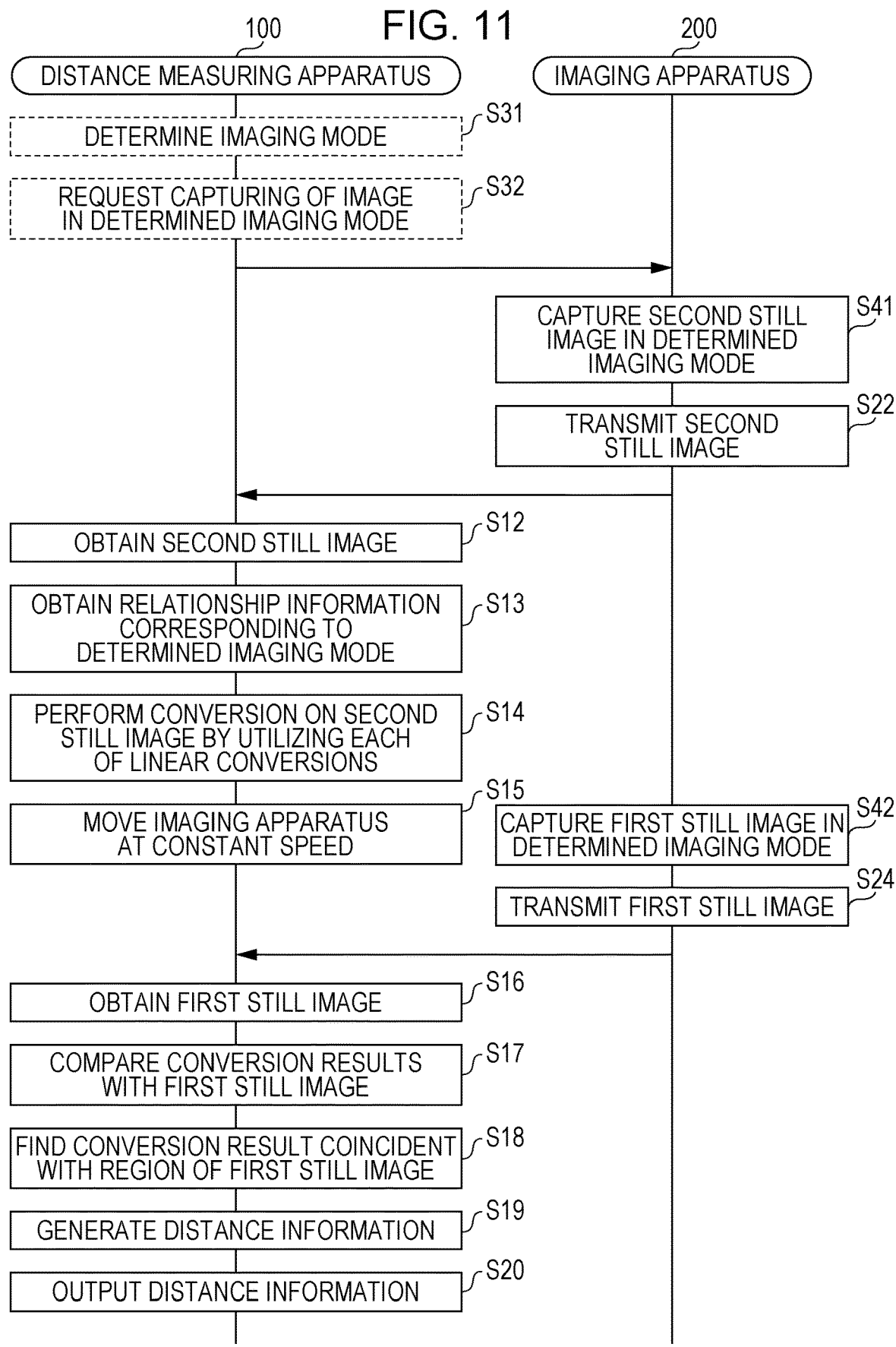
FIG. 11 is a sequence diagram illustrating an example of a distance measuring method of a distance measuring system according to the modified example 1.

FIG. 11 is a sequence diagram illustrating an example of a distance measuring method of the distance measuring system according to the modified example 1.

Since the processing operations of the distance measuring method according to the modified example 1 other than step S12, S14 to S20, S22, and S24 are different from those of the distance measuring method according to the embodiment, the different processing operations will be mainly described.

Firstly, the first acquisition unit 120 of the distance measuring apparatus 100 determines to employ the first imaging mode or the second imaging mode (S31). More specifically, the distance measuring apparatus 100 may determine to first employ the first imaging mode. In a case where a distance to an object cannot be obtained even after all processing operations illustrated in FIG. 11 have been completed, the second imaging mode may be then selected in order to perform the processing operations illustrated in FIG. 11. The setting of imaging mode may be according to the setting obtained by receiving a user's input. In this case, the distance measuring apparatus 100 may receive a user's input via a receiver that is include in the distance measuring apparatus 100 and that is implemented as any of various input interfaces for receiving the user's input, or receive a user's input from an external information terminal, such as a smartphone, via the communication IF 104.

Next, the first acquisition unit 120 transmits a control signal including a request for capturing an image by employing the determined imaging mode to the imaging apparatus 200 (S32). It should be noted that, as compared to step S11, step S32 is different only in that the request for capturing an image includes information indicating an imaging mode. Step S32 may also not be performed by the distance measuring apparatus 100, similarly to step S11.

Next, the imaging apparatus 200 obtains the second still image by performing imaging in the determined imaging mode while remaining stationary (S41).

Subsequently, after steps S22 and S12 are performed, the second acquisition unit 130 obtains the relationship information corresponding to the determined imaging mode (S33). To be specific, in a case where the first imaging mode is selected, the second acquisition unit 130 obtains the first relationship information, and in a case of the second imaging mode, obtains the second relationship information.

Next, the moving unit 110 of the distance measuring apparatus 100 moves the imaging apparatus 200 at a predetermined constant speed (S15). The imaging apparatus 200 obtains the first still image by performing imaging in the determined imaging mode while moving at a constant speed (S42).

Accordingly, steps S24, and S16 to S20 are performed, and processing is then ended. In step S19, the distance generator 150 generates a distance by using the relationship information obtained by the second acquisition unit 130.

As described above, in the distance measuring system 1 according to the modified example 1, a distance is measured by using different kinds of relationship information in accordance with different imaging modes. As a result, blurring amount due to relative movement of an object relative to the imaging apparatus 200 can be more greatly adjusted. Therefore, even if a distance to an object from the imaging apparatus 200 is relatively long, the distance may be effectively specified.

1-4-2. Modified Example 2

A modified example 2 will be described below.

In the description of the distance measuring system 1 according to the modified example 1 of the embodiment, a case of imaging in different imaging modes using different row exposure intervals is explained. The different imaging modes are, however, not necessarily defined by different row exposure intervals. For example, the distance measuring system 1 may be applied when images are captured in different imaging modes using different focal lengths.

In this case, the imaging apparatus 200 is capable of selectively switching between a third imaging mode and a fourth imaging mode to perform imaging. In the third imaging mode, an image is captured with a first focal length. In the fourth imaging mode, an image is captured with a second focal length longer than the first focal length.

In this case, in a case where the first still image and the second still image obtained by the first acquisition unit 120 are captured with the first focal length, the second acquisition unit 130 obtains third relationship information corresponding to the first focal length. In other words, the second acquisition unit 130 obtains the third relationship information corresponding to the third imaging mode.

Similarly, in a case where the first still image and the second still image obtained by the first acquisition unit 120 are captured with the second focal length, the second acquisition unit 130 obtains fourth relationship information corresponding to the second focal length. In other words, the second acquisition unit 130 obtains the fourth relationship information corresponding to the fourth imaging mode.

Here, the third relationship information and the fourth relationship information will be described.

Figure 12:
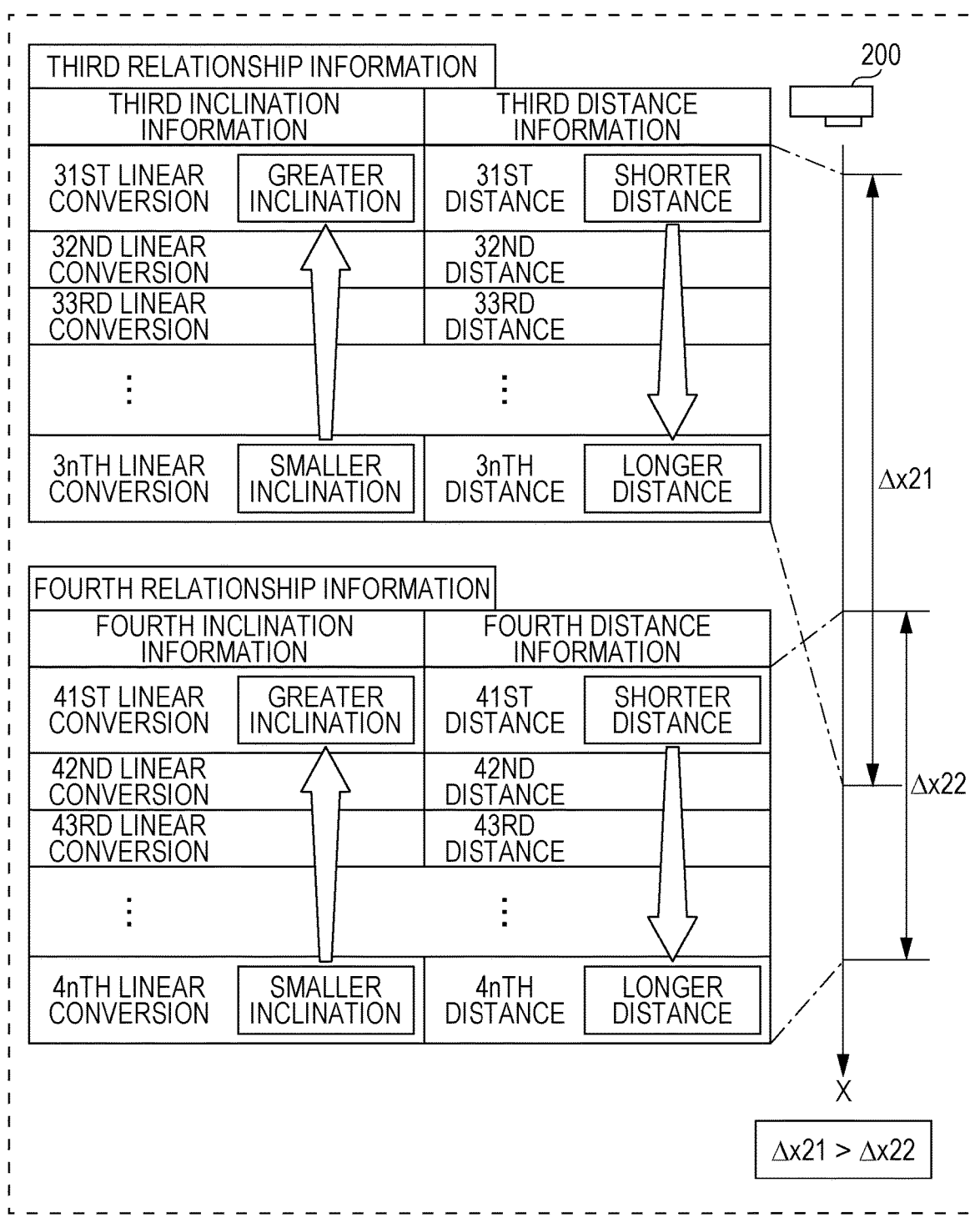
FIG. 12 is a diagram for describing third relationship information and fourth relationship information according to a modified example 2.

FIG. 12 is a diagram for describing the third relationship information and the fourth relationship information according to the modified example 2.

As described above, the third relationship information corresponds to the third imaging mode, and the fourth relationship information corresponds to the fourth imaging mode. In the third relationship information and the fourth relationship information, similarly to the relationship information illustrated in FIG. 4, linear conversions and distances are associated in one-to-one correspondence. Additionally, the 31st to 3nth linear conversions and the 41st to 4nth linear conversions indicate that, the greater the value of "k" of the kth linear conversion, the smaller the inclination degree. Further, the 31st to 3nth distances and the 41st to 4nth distances indicates that, the greater the value of "k" of the kth distance, the greater (longer) the distance from the imaging apparatus 200.

The distribution range of the 41st to 4nth distances associated in the fourth relationship information includes the distribution range of longer distances from the imaging apparatus 200 than the 31st to 3nth distances associated in the third relationship information. The value of distribution density of the 41st to 4nth distances is smaller than the value of distribution density of the 31st to 3nth distances. In other words, difference Δx21 between the 31st distance and the 3nth distance is greater than difference Δx22 between the 41st distance and the 4nth distance. It should be noted that, since the third relationship information and the fourth relationship information have the same relationship as the first relationship information and the second relationship information, the detailed description is omitted.

The detailed description of the operation performed by the distance measuring system 1 according to the modified example 2 is omitted because the operation can be described by regarding, in the description of the modified example 1, the first imaging mode as the third imaging mode, the second imaging mode as the fourth imaging mode, the first relationship information as the third relationship information, and the second relationship information as the fourth relationship information.

1-4-3. Modified Example 3

A modified example 3 will be described below.

In the distance measuring system 1 according to the modified example 1, it may be determined whether an object is a moving object by using a third still image and a fourth still image that are obtained by capturing the second still image in the first imaging mode and the second imaging mode.

In this case, the first acquisition unit 120 obtains, as the second still image, the third still image captured in the first imaging mode by the imaging apparatus 200 remaining stationary and the fourth still image captured in the second imaging mode by the imaging apparatus 200 remaining stationary.

The comparator 140 determines whether an image difference between a region of the third still image and the region of the fourth still image is a certain extent or more by comparing the third still image and the fourth still image with each other. In a case where an image difference is present in the region to a certain extent or more, the comparator 140 determines that the object in the region is a moving object.

It should be noted that the distance generator 150 may not generate a result of distance measuring for the region where it is determined that an object is moving.

The operation will be described below.

Figure 13:
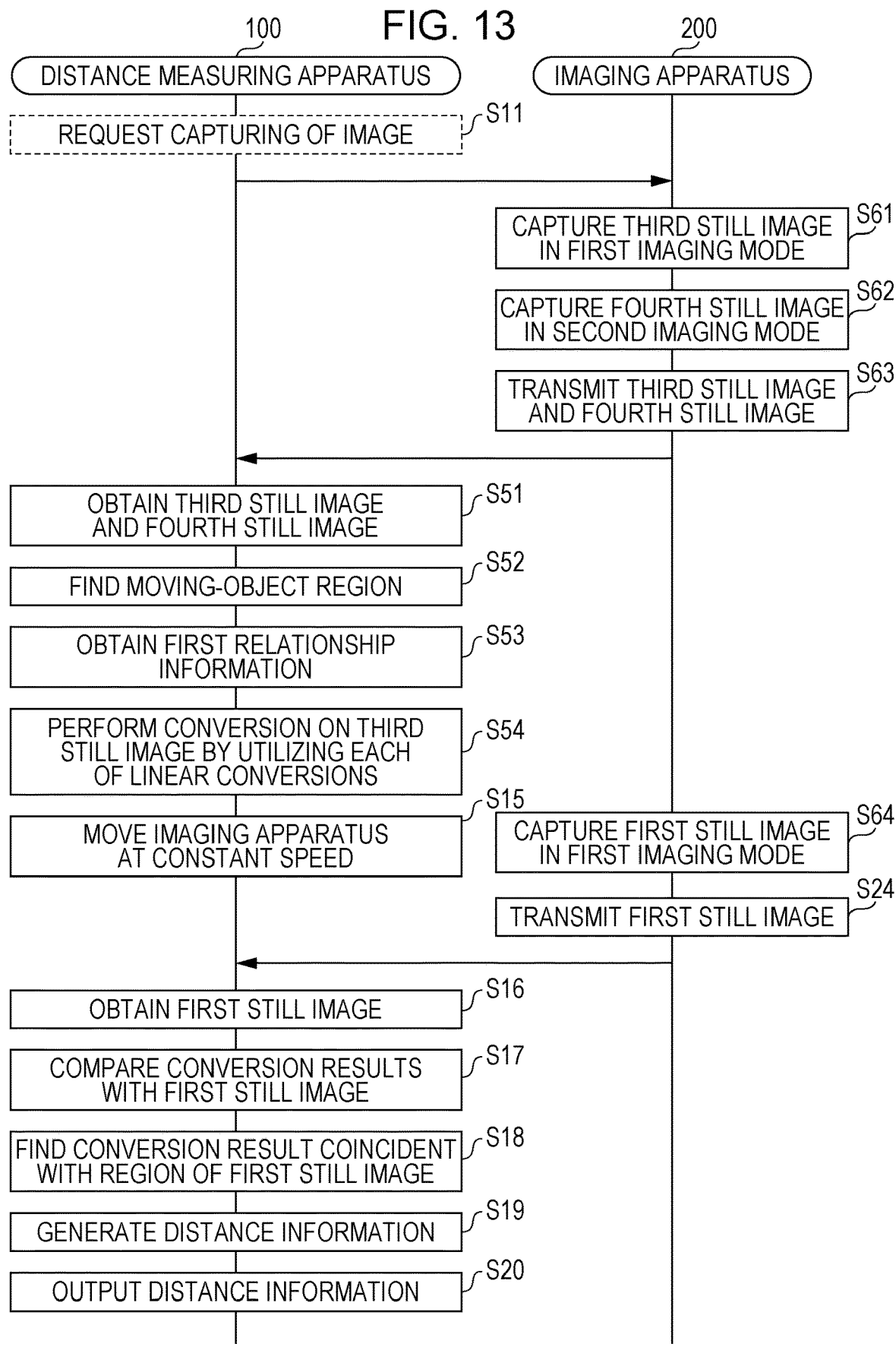
FIG. 13 is a sequence diagram illustrating an example of a distance measuring method of a distance measuring system according to a modified example 3.

FIG. 13 is a sequence diagram illustrating an example of a distance measuring method of a distance measuring system according to the modified example 3.

Since the processing operations of the distance measuring method according to the modified example 3 other than step S11, S15 to S20, and S24 are different from those of the distance measuring method according to the embodiment, the different processing operations will be mainly described.

First, after step S11, the imaging apparatus 200 obtains the third still image by perform imaging in the first imaging mode while remaining stationary (S61). Next, the imaging apparatus 200 obtains the fourth still image by performing imaging in the second imaging mode while remaining stationary (S62). In steps S61 and S62, the imaging apparatus 200 can obtain the third still image and the fourth still image as two kinds of the second still image. Accordingly, the imaging apparatus 200 transmits the third still image and the fourth still image to the distance measuring apparatus 100 (S63).

As a result, in the distance measuring apparatus 100, the first acquisition unit 120 obtains the third still image and the fourth still image (S51).

The comparator 140 determines whether an image difference between a region of the third still image and the region of the fourth still image is a certain extent or more by comparing the third still image and the fourth still image with each other. In a case where image difference is present in the region to a certain extent or more, the comparator 140 determines that the object in the region is a moving object (S52).

The second acquisition unit 130 obtains the first relationship information (S53).

The comparator 140 performs conversion on the third still image by utilizing each of the linear conversions in the first relationship information obtained by the second acquisition unit 130 (S54).

Subsequently, the moving unit 110 of the distance measuring apparatus 100 moves the imaging apparatus 200 at a predetermined constant speed (S15). The imaging apparatus 200 obtains the first still image by performing imaging in the first imaging mode while moving at a constant speed (S64).

Accordingly, steps S24, and S16 to S20 are performed, and processing is then ended. In step S19, the distance generator 150 generates a distance by using the first relationship information obtained by the second acquisition unit 130.

It should be noted that, in the modified example 3, in steps S61 and S64 imaging is performed in the first imaging mode, in step S62 in the second imaging mode. Conversely, in step S61 and S64 imaging may be performed in the second imaging mode, in step S62 in the first imaging mode. In this case, in step S53 the second relationship information is obtained, and in step S19 a distance is generated by using the second relationship information obtained by the second acquisition unit 130.

1-4-4. Modified Example 4

A modified example 4 will be described below.

In the embodiment and the modified examples 1 to 3, the processing operation of performing conversion on the second still image or the third still image by utilizing each of the linear conversions and the processing operation of capturing the first still image while the imaging apparatus 200 is moving at a constant speed are performed in parallel. These processing operations, however, may not be performed in parallel.

In the distance measuring system 1 according to the modified example 4, the processing operation performed by the comparator 140 of the distance measuring apparatus 100 is comparison processing for specifying one piece of inclination information.

Figure 14:
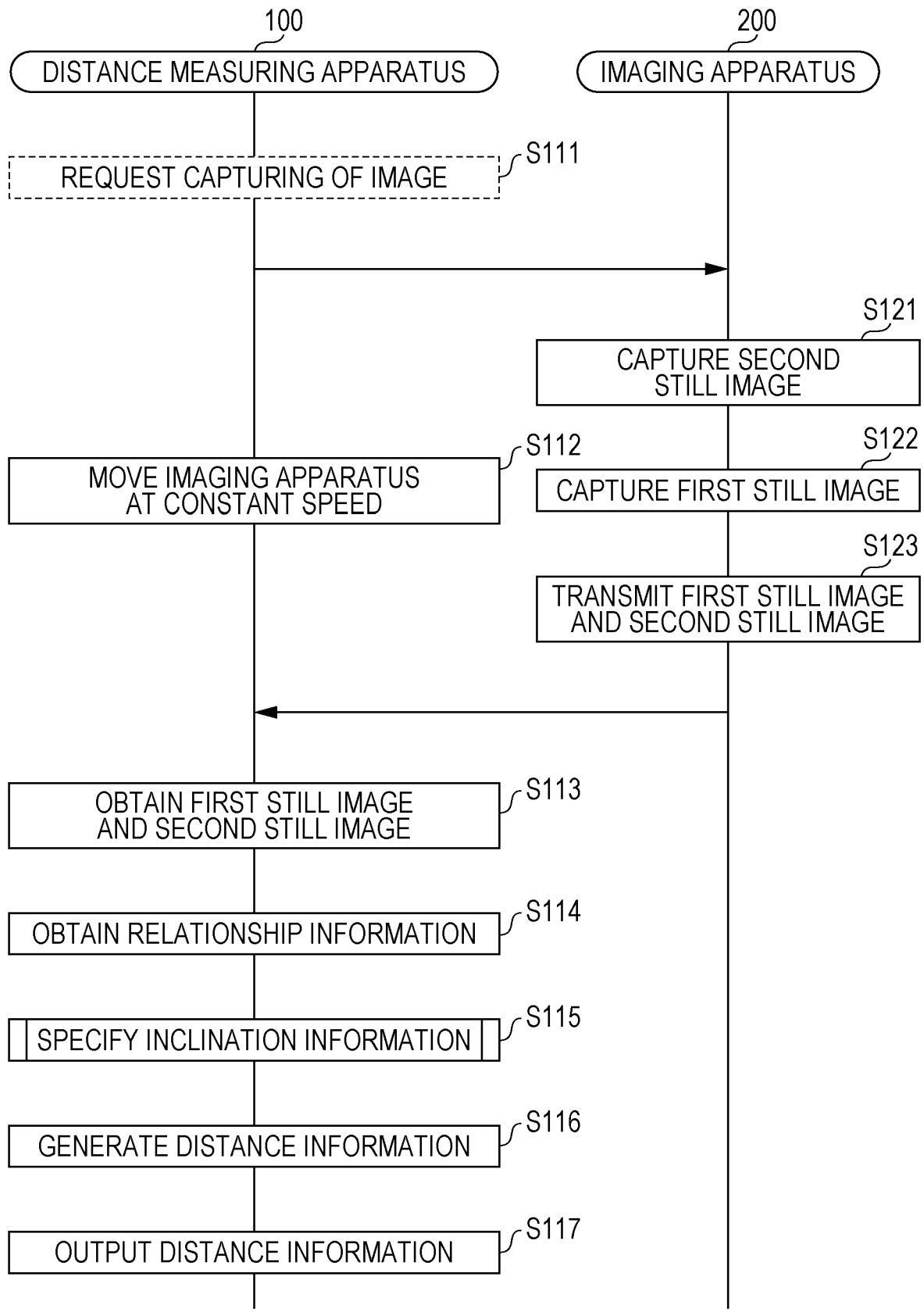
FIG. 14 is a sequence diagram illustrating an example of a distance measuring method of a distance measuring system according to a modified example 4.
Figure 15:
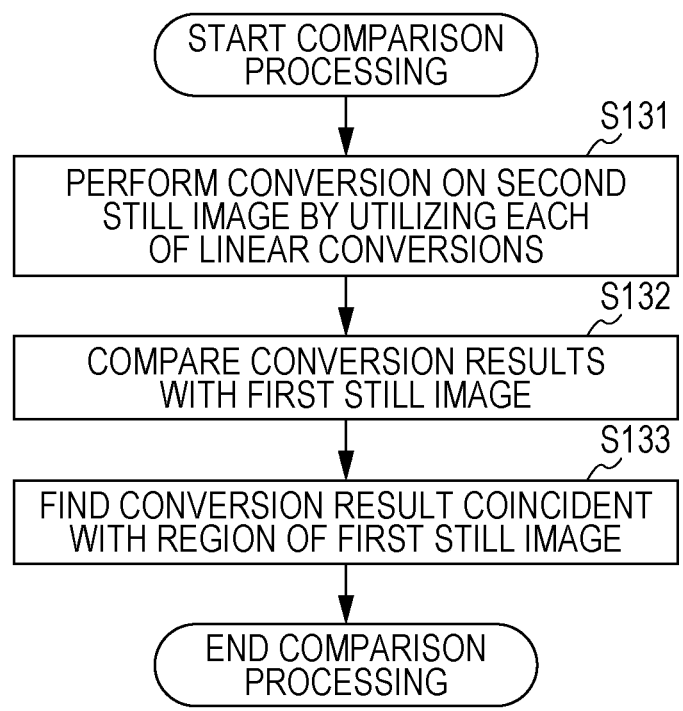
FIG. 15 is a flowchart illustrating details of comparison processing.

FIG. 14 is a sequence diagram illustrating an example of a distance measuring method of the distance measuring system according to the modified example 4. FIG. 15 is a flowchart illustrating details of comparison processing.

Firstly, the first acquisition unit 120 of the distance measuring apparatus 100 transmits a control signal including a request for capturing an image to the imaging apparatus 200 (S111).

Next, the imaging apparatus 200 obtains the second still image by performing imaging while remaining stationary (S121).

Subsequently, the imaging apparatus 200 transmits the obtained second still image 420 to the distance measuring apparatus 100 (S122).

Subsequently, the moving unit 110 of the distance measuring apparatus 100 moves the imaging apparatus 200 at a predetermined constant speed (S112). The imaging apparatus 200 obtains the first still image by performing imaging while moving at a constant speed (S122). It should be noted that the imaging apparatus 200 images the same objects 310 and 320 for capturing the first still image 410 and the second still image 420 in order to measure a distance.

The imaging apparatus 200 may obtain the first still image 410 by performing imaging at a predetermined timing of causing the moving unit 110 move at a constant speed, the predetermined timing being indicated by information received from the distance measuring apparatus 100. The information indicating the predetermined timing may be transmitted, immediately before the distance measuring apparatus 100 causes the moving unit 110 to move, as a control signal for causing the imaging apparatus 200 to perform imaging, or included in the control signal including the request for capturing an image, the control signal including the request for capturing an image being transmitted in step S111. Furthermore, in a case where the imaging apparatus 200 is equipped with an acceleration sensor, the imaging apparatus 200 may capture the first still image 410 after detecting start of movement of the imaging apparatus 200 by using the acceleration sensor. In this manner, steps S112 and S122 are performed synchronously.

It should be noted that step S121, and steps S112 and S122 may be reversed in the order of the processing flow.

Next, the imaging apparatus 200 transmits the first still image 410 and the second still image 420 to the distance measuring apparatus 100 (S123).

Accordingly, in the distance measuring apparatus 100, the first acquisition unit 120 obtains the first still image 410 and the second still image 420 (S113).

Accordingly, the second acquisition unit 130 obtains the relationship information (S114). The comparator 140 then specifies inclination information (S115). The details of the comparison processing performed by the comparator 140 for specifying inclination information will be described later.

Subsequently, the distance generator 150 generates distance information by using the specified inclination information and the relationship information (S116).

Finally, the output unit 160 outputs the generated distance information (S117).

It should be noted that step S114 can be performed anytime before step S116.

Next, the details of the comparison processing in step S115 will be described.

FIG. 15 is a flowchart illustrating details of the comparison processing.

After the comparison processing is started, the comparator 140 performs conversion on the second still image 420 by utilizing each of the linear conversions (S131).

The comparator 140 then compares conversion results with the first still image 410 (S132).

Accordingly, the comparator 140 finds a conversion result coincident with a region of the first still image 410, and specifies inclination information by specifying the linear conversion corresponding to the coincident conversion result (S133).

It should be noted that the comparison processing is not limited to performing conversion on the second still image by utilizing each of the linear conversions as in step S131 in the above-described modified example 4. For example, by performing image processing on the first still image and the second still image, a region where an inclination difference is present and the inclination difference may be detected.

(Others)

In the distance measuring apparatus 100 according to the embodiment and the modified examples, the moving unit 110 moves the imaging apparatus 200 linearly in the Y-axis direction at a constant speed, but the moving unit 110 may rotate the imaging apparatus 200 on the axis parallel to a direction of column (the Z-axis direction) of the rolling-shutter-type image sensor while moving the imaging apparatus 200 at a constant speed. In this case, the relationship information in which conversions and distances are associated in one-to-one correspondence are used, the conversions being used to perform conversion according to distortion of an image captured by the image sensor while the imaging apparatus 200 rotates and moves at a constant speed.

In the distance measuring apparatus 100 according to the embodiment and the modified examples, the moving unit 110 moves the imaging apparatus 200 linearly in the Y-axis direction at a constant speed, but the moving unit 110 may moves the imaging apparatus 200 in the X-axis direction. In this case, the relationship information in which conversions and distances are associated in one-to-one correspondence are used, the conversions being used to perform conversion according to distortion of an image captured by the image sensor while the imaging apparatus 200 moves in the X-axis direction at a constant speed.

The second still image is not limited to an image captured by the imaging apparatus 200 remaining stationary as in the distance measuring apparatus 100 according to the embodiment and the modified examples. For example, the second still image may be an image captured by the imaging apparatus 200 moving at a second constant speed slower than the first speed at which the moving unit 110 moves the imaging apparatus 200 while the first still image is captured. It should be noted that the first speed and the second speed are fixed speeds. Even in such a case, an inclination difference between the first still image and the second still image occurs, and therefore a distance to an object from the imaging apparatus 200 can be measured by employing the same method as that of the embodiment.

The moving unit 110 of the distance measuring apparatus 100 according to the embodiment and the modified examples may be a camera stabilizer. The camera stabilizer includes a drive mechanism for driving a mounted camera in directions of three axes, which usually aims to eliminate camera shake. Such a drive mechanism enables the imaging apparatus 200 to move at a constant speed. In this case, the drive mode of the camera stabilizer may be switched between a shake correction mode for eliminating shake of the mounted camera and a distance measuring mode for measuring a distance by using the mounted camera. In the distance measuring mode, while camera shake due to movement of camera is corrected, the camera moves at a constant speed and a distance is measured. Furthermore, in a case of measuring a distance by using the camera stabilizer, the second still image may be captured in the shake correction mode and the first still image may be captured in the distance measuring mode.

Although the distance measuring apparatus 100 according to the embodiment does not include the imaging apparatus 200, the distance measuring apparatus 100 may include the imaging apparatus 200.

It should be noted that, in the embodiment and the modified examples, each element may be implemented as a dedicated hardware or by executing an appropriate program. Each element may be implemented such that a program execution unit, such as a CPU or a processor, reads out and executes a software program stored in a storage medium, such as a hard disk or a semiconductor memory. Here, software that may implement the distance measuring apparatus of the embodiment is a program described below.

The program causes a computer to perform a method for measuring a distance, the method using an image capture sensor that performs imaging by employing a rolling shutter method. The method for measuring a distance includes moving the image capture sensor at a constant speed, obtaining a first still image and a second still image, the first still image being captured by the image capture sensor while the image capture sensor moves at a first constant speed, the second still image being captured by the image capture sensor while the image capture sensor moves at a second constant speed slower than the first constant speed or remains stationary, obtaining relationship information in which as a distance to an object from the image capture sensor increases, an inclination difference between the object in the first still image and the object in the second still image decreases, specifying inclination information indicating the inclination difference in a region between the first still image and the second still image by comparing the first still image and the second still image with each other, specifying a distance by using the specified inclination information, the distance being associated with the obtained relationship information, and generating distance information indicating the specified distance.

The distance measuring apparatus 100 and the distance measuring method according to one or more aspects of the present disclosure are described according to the embodiment. The present disclosure, however, is not limited to the embodiment. Various modifications of the embodiment that may be reached by those skilled in the art within the scope of the present disclosure and combinations of the elements of the different embodiments may be included in one or more aspects of the present disclosure.

The present disclosure may be employed as a distance measuring apparatus or the like that reduces the cost of hardware and the processing load.

What is claimed is:

1. An apparatus comprising:
   an image capture sensor configured to perform imaging by employing a rolling shutter method;
   a stand configured to move the image capture sensor at a constant speed;
   a processor; and
   a memory storing a computer program, which when executed by the processor, causes the processor to perform operations including:
   obtaining a first still image by using the image capture sensor while the image capture sensor is moved by the stand at a first constant speed;
   obtaining a second still image by using the image capture sensor while the image capture sensor is moved by the stand at a second constant speed slower than the first constant speed or is remained stationary;
   obtaining relationship information in which as a distance to a sample from the image capture sensor increases, an inclination difference between the sample in the first still image and the sample in the second still image decreases;
   specifying inclination information indicating the inclination difference between an image of an object in the first still image and an image of the object in the second still image by comparing the first still image and the second still image with each other, the inclination difference being a difference in inclination between the image of the object in the first still image and the image of the object in the second still image; and
   generating distance information indicating a distance specified by using the specified inclination information, the distance being associated with the relationship information.

2. The apparatus according to claim 1, wherein
   the obtaining of the relationship information includes obtaining the relationship information in which different distances to the sample from the image capture sensor and linear conversions corresponding to inclination differences, each of which is the inclination difference, are associated in one-to-one correspondence, the specifying includes, by comparing conversion results obtained by performing conversion on one image of the first still image and the second still image by utilizing each of the linear conversions associated in the relationship information with another image of the first still image and the second still image, specifying the inclination information indicating the inclination difference between at least a region of the one image and at least the region of the other image, and the generating includes generating the distance information indicating the distance specified as the distance to the object in the at least the region of the one image by using the specified inclination information, the distance being associated with the relationship information.

3. The apparatus according to claim 1, wherein the image capture sensor is configured to perform imaging for each row of rows of pixels arranged in a matrix form with a row exposure interval between an exposure start time for the row and an exposure start time for a subsequent row of the rows, the row exposure interval being a first row exposure interval or a second row exposure interval longer than the first row exposure interval, in the obtaining of the relationship information, in a case where the first still image and the second still image are captured with the first row exposure interval, first relationship information corresponding to the first row exposure interval is obtained, and in a case where the first still image and the second still image are captured with the second row exposure interval, second relationship information corresponding to the second row exposure interval is obtained, a distribution range of second distances associated in the second relationship information is a distribution range of longer distances from the image capture sensor than first distances associated in the first relationship information, and a value of distribution density of the second distances is smaller than a value of distribution density of the first distances.

4. The apparatus according to claim 3, wherein in the obtaining of the second still image, a third still image and a fourth still image are obtained as the second still image, the third still image being captured with the first row exposure interval by the image capture sensor remaining stationary, the fourth still image being captured with the second row exposure interval by the image capture sensor remaining stationary, and the specifying includes:

determining whether an image difference between a part of region of the third still image and a part of region of the fourth still image is a certain extent or more by comparing the third still image and the fourth still image with each other, and in a case where the image difference is the certain extent or more, determining that an object in the part of region of the third still image and the object in the part of region of the fourth still image are a moving object.

5. The apparatus according to claim 1, wherein the image capture sensor is configured to perform imaging with a first focal length or a second focal length longer than the first focal length, in the obtaining of the relationship information, in a case where the first still image and the second still image are captured with the first focal length, third relationship information corresponding to the first focal length is obtained, and in a case where the first still image and the second still image are captured with the second focal length, fourth relationship information corresponding to the second focal length is obtained, a distribution range of fourth distances associated in the fourth relationship information is a distribution range of longer distances from the image capture sensor than third distances associated in the third relationship information, and a value of distribution density of the fourth distances is smaller than a value of distribution density of the third distances.

6. The apparatus according to claim 1, wherein the stand is configured to move the image capture sensor in a horizontal direction at a constant speed, in the obtaining of the first still image, the image capture sensor is moved in the horizontal direction by the stand at the first constant speed, in the obtaining of the second still image, the image capture sensor is moved in the horizontal direction by the stand at the second constant speed slower than the first constant speed or remains stationary, and the inclination difference is a difference in inclination from a vertical direction between the image of the object in the first still image and the image of the object in the second still image.

7. The apparatus according to claim 1, wherein the stand is configured to move the image capture sensor in a horizontal direction along a straight line at a constant speed, in the obtaining of the first still image, the image capture sensor is moved in the horizontal direction along the straight line by the stand at the first constant speed, in the obtaining of the second still image, the image capture sensor is moved in the horizontal direction by the stand along the straight line at the second constant speed slower than the first constant speed or remains stationary, the inclination difference is a difference in inclination from a vertical direction between the image of the object in the first still image and the image of the object in the second still image, and in the specifying of the distance, a distance between the straight line and the object is specified.

8. The apparatus according to claim 1, wherein the stand is configured to move the image capture sensor at a constant speed in a horizontal direction perpendicular to an optical axis of the image capture sensor, in the obtaining of the first still image, the image capture sensor is moved in the horizontal direction by the stand at the first constant speed, in the obtaining of the second still image, the image capture sensor is moved in the horizontal direction by the stand at the second constant speed or remains stationary, and the inclination difference is a difference in inclination from a vertical direction of the first still image between the image of the object in the first still image and the image of the object in the second still image, and in the specifying of the distance, a distance from the image capture sensor to the object in a direction of the optical axis is specified.

9. The apparatus according to claim 1, wherein the inclination difference is an inclination degree at which the image of the object in the first still image is tilted with respect to the image of the object in the second still image.

10. A method for measuring a distance, the method using an image capture sensor configured to perform imaging by employing a rolling shutter method, the method comprising:

moving the image capture sensor at a constant speed;

obtaining a first still image and a second still image, the first still image being captured by the image capture sensor while the image capture sensor moves at a first constant speed, the second still image being captured by the image capture sensor while the image capture sensor moves at a second constant speed slower than the first constant speed or is remained stationary;

obtaining relationship information in which as a distance to a sample from the image capture sensor increases, an inclination difference between the sample in the first still image and the sample in the second still image decreases;

specifying inclination information indicating the inclination difference between an image of an object in the first still image and an image of the object in the second still image by comparing the first still image and the second still image with each other, the inclination difference being a difference in inclination between the image of the object in the first still image and the image of the object in the second still image;

specifying a distance by using the specified inclination information, the distance being associated with the obtained relationship information; and generating distance information indicating the specified distance.

* * * * *